United States Patent [19]

Crawford, III

[11] 4,324,147

[45] Apr. 13, 1982

[54] VARIABLE CROSS SECTION V-BELT

[76] Inventor: Russell C. Crawford, III, 6991 Juana Dr., Millington, Tenn. 38053

[21] Appl. No.: 129,607

[22] Filed: Mar. 11, 1980

[51] Int. Cl.³ ......................... F16H 19/04; F16G 5/00

[52] U.S. Cl. ......................................... 74/37; 474/148; 474/167; 474/237; 474/265; 474/273

[58] Field of Search .............. 74/37; 474/58, 148–150, 474/166, 167, 237, 265, 273

[56] References Cited

U.S. PATENT DOCUMENTS

| | | | |
|---|---|---|---|
| 1,792,921 | 2/1931 | Newhouse | 474/265 |
| 2,328,475 | 8/1943 | Lockmann et al. | 74/55 |
| 2,920,474 | 1/1960 | Dodwell | 474/265 |
| 2,941,412 | 6/1960 | Wrobbel | 474/25 |

FOREIGN PATENT DOCUMENTS

| | | | |
|---|---|---|---|
| 52095 | 1/1933 | Norway | 474/150 |
| 684238 | 9/1979 | U.S.S.R. | 74/37 |

*Primary Examiner*—Lawrence J. Staab

[57] ABSTRACT

My invention relates to a method of power transmission using a new type belt drive. This belt drive will supply both axial motion with a speed reduction or increase and will also change a rotative force into a reciprocating force. All of this would be accomplished by a special flexible V-belt and special pulleys.

3 Claims, 14 Drawing Figures

VARIABLE CROSS SECTION V-BELT

BACKGROUND OF THE INVENTION

Prior to this invention several methods were evolved to solve the problem of changing axial motion into reciprocating motion. Most systems in general use today use a series of gear reductions and a crankshaft connected to weights or a piston cylinder combination. Also in use are matched eccentric plates with ball bearings, eccentric pulleys and various hydraulic, pneumatic and also electro-magnetic repulsion devices. Also there are many cam operated devices.

SUMMARY OF THE INVENTION

A power transmission belt of special design including special reinforced enlarged cross sections which are caused to be pulled over a specially designed pulley axle combination thereby causing the rotative force supplied at the drive pulley to be altered into a combination of reciprocating and axial motion at the driven pulley.

THE DRAWING

Figure 1:
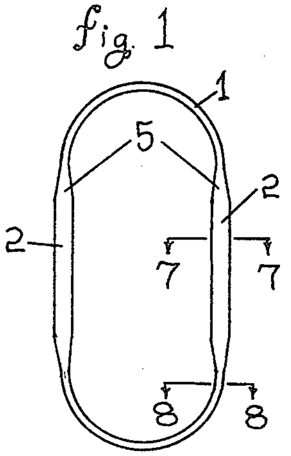
FIG. 1. A side view of a standard "A" cross section V-belt with a portion modified to the dimension of a standard "B" cross section V-belt.
Figure 7:
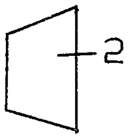
FIG. 7. A sectional end view as indicated at 7—7 on FIG. 1.
Figure 8:
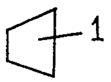
FIG. 8. A sectional end view as indicated at 8—8 on FIG. 1.
Figure 9:
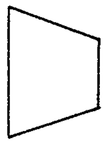
FIG. 9. A sectional end view as indicated at 9—9 on FIG. 3.
Figure 2:
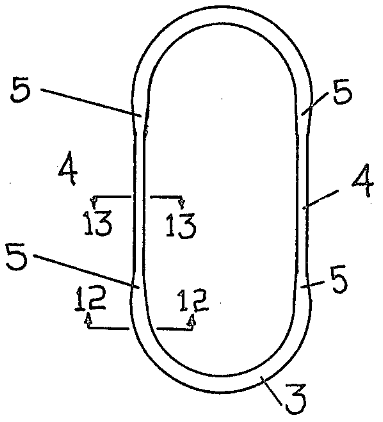
FIG. 2. A side view of a standard "B" cross section V-belt with modifications of a portion to alter it to the dimensions of a standard "A" cross section V-belt.
Figure 12:
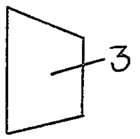
FIG. 12. A sectional end view as indicated at 12—12 on FIG. 2.
Figure 13:
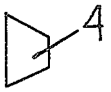
FIG. 13. A sectional end view as indicated at 13—13 on FIG. 2.
Figure 3:
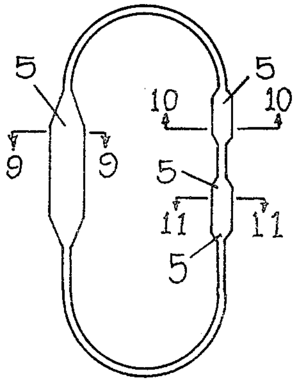
FIG. 3. Shows a side view of multiple modifications to a single V-belt.
Figure 10:
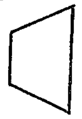
FIG. 10. A sectional end view as indicated at 10—10 on FIG. 3.
Figure 11:
FIG. 11. A sectional end view as indicated at 11—11 on FIG. 3
Figure 4:
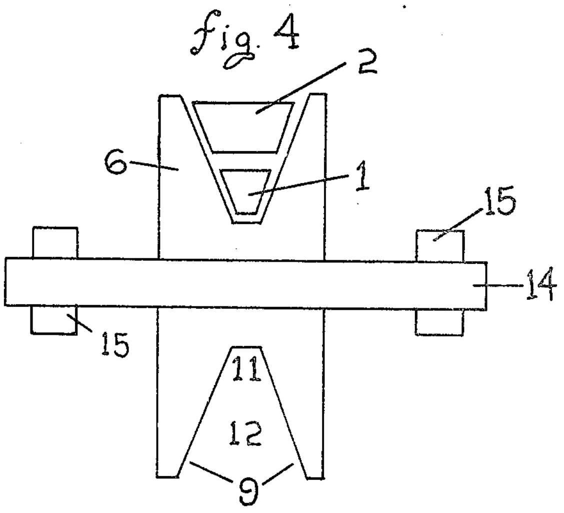
FIG. 4. A cut-away side view showing a pulley-axle modified to carry both "A" cross section and "B" cross section V-belts.
Figure 5:
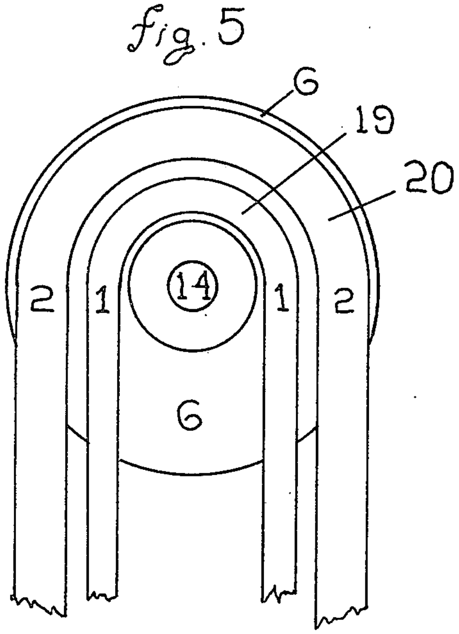
FIG. 5. A cut-away view showing the pulley from the side and the paths of different cross section V-belts.

A standard or non-standard V-belt of any dimension would be constructed as follows: Using standard sizes as an example; a standard "A" cross section belt of dimension 1, would be constructed such that a portion of it would be the dimensions of a standard "B" cross section V-belt 2. This "B" dimension length would be variable as the need would require. Also as further example; a standard "B" cross section V-belt of dimension 3, would have a portion cut away such that a variable length of it would have the dimensions of a standard "A" cross section V-belt 4. Further, a B-belt could have one, two, three or as many modifications as the task called for.

As a means of limiting impact shock on the belt each V-belt cross sectional change would be made as gradually as possible without affecting the usefullness of the belt. This would be done by tapering each transition 5, from one size to another.

Further, transitions are not limited to changes in standard size belts but include changes in size of non-standard to another non-standard and from standard to non-standard or any similar change.

In use the variable cross section V-belt would be the connecting power transfering member between two V-belt pulleys of special design 6,7. Each pulley 6,7, would be capable of handling several different belt cross section sizes. For example pulleys 6,7, can handle standard "A" or "B" cross section sizes in addition to numerous non-standard sizes. Pulley 6, would be mounted on an axle 14, and the axle would allow it to rotate freely under power from some source; however the axle itself would be restrained from moving by restraining means 15. Pulley 7, would be mounted on axle 16, however it would be moveable in a direction opposing the pull of spring 8. Pulley 7, could move in a direction toward or away from pulley 6, as the variable cross section V-belt allowed.

Figure 6:
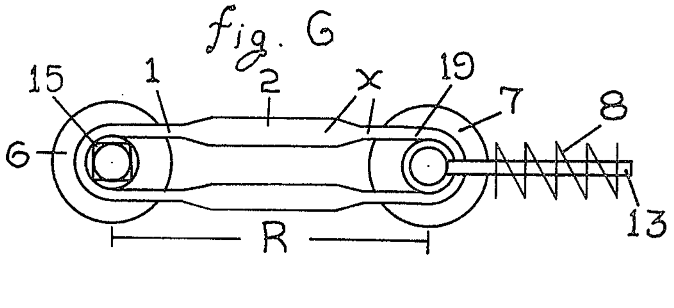
FIG. 6. A diagram showing the working parts as assembled. A side view.
Figure 14:
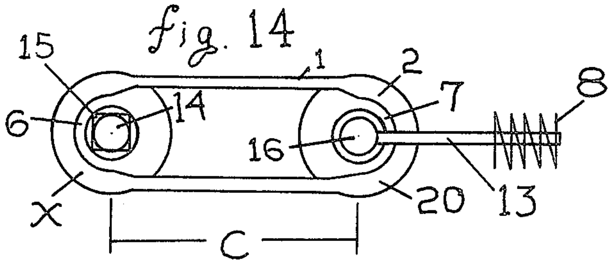
FIG. 14. A side view showing the working parts as assembled.

In order to use the belt-pulley combination as a supply of reciprocating or vibrating force a rotative force must be applied at pulley 6. This rotative force applied to belt X through pulley 6, causes V-belt X, with variable cross section dimensions 1,2, to wedge itself into pulley 6, as pulley 6, rotates. This is due to the wedging of belt X, into V shape grooves 9, of pulleys 6,7. This wedging causes the belt to rotate with the pilley which causes pulley 7, to rotate also. Whenever pulleys 6 and 7, encounter a change in belt cross section such as in FIG. 6, then a change in the relative distances R, to C occurs. This is due to the change in position of the belt X, relative to the axles 14, 16,. This change in belt position from 19, to 20, is due to change in cross sectional dimension from 1 to 2, of the V-belt and the change in the groove width 9, in which the belt must ride from 11, to 12. This causes the belt to travel a greater distance than when a different portion of the belt with a different cross section travels across the pulleys. This causes a longitudanly reciprocating motion on axle 16, and spring 8. Axle 16, is connected to connecting rod 13, which is also connected to spring 8. Pulleys 6,7, also function as flywheels.

I claim:

1. An endless V-belt comprising first portions and second portions, each portion having a constant cross sectional area but the cross sectional area of said first portions being less than the cross sectional area of said second portions, the length of each of said first portions being equal, and the length of each of said second portions being equal, the sum of the lengths of said first and second portions being substantially equal to the circumference of the belt, and said first and second portions alternating with each other and being connected together by relatively short transition portions of gradually tapering cross sectional area.

2. The endless belt of claim 1 in combination with a V-pulley constructed such that the lower portion of the pulley groove will accomodate the first portion of the belt and the outer portion of the pulley groove will accomodate the second portion of the belt.

3. The endless belt of claim 1 in combination with a pair of pulleys, one of the pulleys being restrained from movement towards the other pulley and being mounted for rotation, the other of the pulleys being mounted for movement towards and away from said one pulley and being spring biased away from said one pulley, said endless belt being the connecting power transferring medium between the two pulleys such that said other pulley is caused to simultaneously rotate and reciprocate due to the influence of said belt in response to rotation of said one pulley.

* * * * *